United States Patent [19]

Gunnerson et al.

[11] Patent Number: 4,959,236

[45] Date of Patent: Sep. 25, 1990

[54] PROCESS FOR REMOVING PELLICLE FROM NUT MEATS

[75] Inventors: Robert E. Gunnerson, Manteca; Richard C. Bruno, Lodi, both of Calif.

[73] Assignee: Sun-Diamond Growers of California, Stockton, Calif.

[21] Appl. No.: 378,346

[22] Filed: Jul. 11, 1989

[51] Int. Cl.$^5$ .............................................. A23L 1/00
[52] U.S. Cl. ..................... 426/288; 426/482
[58] Field of Search ................ 426/482, 288, 507

[56] References Cited

U.S. PATENT DOCUMENTS

| | | | |
|---|---|---|---|
| 2,156,406 | 5/1939 | Stagmeier | 426/288 |
| 2,273,183 | 2/1942 | Edes | 426/482 |
| 2,277,485 | 3/1942 | Frazier | 426/288 |
| 2,530,272 | 11/1950 | Thrasher | 426/482 |
| 2,687,155 | 8/1954 | D'Aquin et al. | 426/482 |
| 3,118,477 | 1/1964 | Cartwright | 426/288 |
| 3,264,113 | 8/1966 | Barta et al. | 426/482 |
| 3,873,743 | 3/1975 | Aepli et al. | 426/288 |
| 4,130,668 | 12/1978 | Otsuka et al. | 426/482 |
| 4,161,459 | 7/1979 | Otsuka et al. | 426/482 |
| 4,220,670 | 9/1980 | Mohri et al. | 426/482 |
| 4,276,316 | 6/1981 | Sharma | 426/482 |
| 4,491,603 | 1/1985 | George | 426/482 |
| 4,595,595 | 6/1986 | Gunnerson et al. | 426/483 |
| 4,600,593 | 7/1986 | Swisher | 426/482 |
| 4,738,860 | 4/1988 | Lee | 426/482 |

*Primary Examiner*—George Yeung
*Attorney, Agent, or Firm*—Townsend and Townsend

[57] ABSTRACT

The present invention provides a novel process for removing the pellicle from nut kernels and a blanching composition for use in the treatment of nuts.

More particularly, the process of the invention comprises the steps of:

(a) immersing nut kernels in a composition comprising a mixture of a vegetable oil and a wetting agent in a solution of water and, optionally, a sugar, at ambient temperature to soften and loosen the pellicle;
(b) removing the nut kernels from the composition and draining the nut kernels;
(c) exposing the nut kernels to ambient temperature water to remove the pellicle; and
(d) separating the nut kernels from the pellicle.

16 Claims, No Drawings

PROCESS FOR REMOVING PELLICLE FROM NUT MEATS

BACKGROUND OF THE INVENTION

This invention relates to the processing of nuts, and in particular to the removal of the pellicle from nut kernels.

The pellicle is the thin skin encircling the kernel (or endosperm) of nut meats. By removing pellicle, one enhances the character of the nut meats for a variety of reasons, including facilitating the addition of flavorings or coatings, dicing, or forming the kernel into nut paste or nut butter. Since the pellicle tends to be bitter in taste, can cause irritation and sores in the mouths of some people, and causes color reactions in some use applications such as in bread, ice cream and cheese, it is often desirable to remove the pellicle from the nuts for these reasons.

The use of chemical and mechanical processes for the removal of the pellicle from the kernels of nuts has been long known. Chemical treatments today primarily involve the use of alkaline solutions along with agitation or other mechanical action. Also known are the use of surface active agents to increase the wetting of the pellicle or treatment in hot liquid baths.

Mechanical removal is often unsatisfactory because it tends to break the kernel into fragmentary parts or abrade or otherwise damage fragile nuts. In the case of convoluted nuts such as walnuts, it does not give the desired result of effectively removing the pellicle.

Alkaline treatments to condition (soften or loosen) the pellicle for easier removal by physical means, while effective in removing at least some of the pellicle, have several undesirable effects. Due to the high oil contents of nuts, the alkaline salts react with the oil within the nut kernel to form soaps which impart a strong, unpleasant flavor. Shelf stability of alkaline-treated nuts is diminished due to an increased rate of oxidative and hydrolytic rancidity. Also, alkaline treatments react with the tannins and natural pigments of the pellicle, especially in the case of walnuts, causing the kernels to discolor to shades of pink, lavender or brown. Further, alkaline treatments often require a subsequent treatment with an acid solution to neutralize in part the deleterious effects of the alkaline. One consequence of neutralizing acid treatment is the development of bitter/salty flavors.

The use of wetting agents to increase the wetting or loosening of the pellicle is generally effective but is undesirable because such treatment results in chemical or detergent flavors.

The use of hot liquid baths followed by hot oil treatment (U.S. Pat. No. 4,595,595) imparts a roasted flavor to the treated nut meats, which is often undesirable. Also, in nut kernels of very high natural oil content, such as walnuts, hot oil treatments may not be desirable as the nuts tend to absorb a portion of the hot oil.

There thus remains a need for a process for removing the pellicle from nut kernels, particularly those such as walnuts whose surfaces are irregular or convoluted, which gives nut meats that are undamaged, of natural color, without any bitter or off flavors, and stable in storage.

SUMMARY OF THE INVENTION

The present invention provides a novel process for removing the pellicle from nut kernels and a blanching composition for use in the treatment of nuts.

More particularly, the process of the invention comprises the steps of:

(a) immersing nut kernels in a composition comprising a mixture of a vegetable oil and a wetting agent in a solution of water and, optionally, a sugar, at ambient temperature, to soften and loosen the pellicle;

(b) removing the nut kernels from the composition and draining the nut kernels;

(c) exposing the nut kernels to ambient temperature water to remove the pellicle; and (d) separating the nut kernels from the pellicle.

The blanched nut meats may then be dried and stored or further processed, as desired.

DETAILED DESCRIPTION OF THE INVENTION

It has now been found that by treating nut kernels with a composition comprising a mixture of a vegetable oil and a wetting agent in water at ambient temperature, substantially all of the pellicle is removed from the kernels when they are subsequently exposed to water. At the same time, the disadvantages associated with prior blanching methods are avoided and the resulting kernels are bright and uniform in color, with a mild flavor and a crisp texture.

The process of the invention is applicable to any shelled nut kernels but is particularly useful for removing pellicle from convoluted nuts. Examples of convoluted nuts are black walnuts, pecans and English or Persian walnuts (*Juglans regia* L.). The process is especially useful for walnut kernels since walnut kernels, in addition to being greatly convoluted, are subject to natural color variation and, due to their high oil content, are very tender and subject to mechanical and chemical damage. The invention is a mild, non-degrading process, running at ambient temperature and without harsh mechanical handling, and it provides maximum yield and quality of the blanched nut meat. The nut meats to be treated may be whole kernels or they may be pieces of nut kernels.

Any edible, liquid, refined or partially refined vegetable oil is suitable for use in the present invention. Such oils include coconut oil, palm kernel oil, olive oil, soybean oil, corn oil, sesame seed oil, safflower oil, cottonseed oil, walnut oil, and mixtures thereof. The vegetable oil increases the wetting ability of the wetting agent while at the same time eliminating the off-flavor of the wetting agent. While any vegetable oil is effective in removing off-flavor, walnut oil is preferred as it also contributes to the normal flavor of walnuts. Mixtures of walnut oil and other edible liquid oils may be employed. The vegetable oil is present in the range of from about 1.5 percent to about 10 percent by weight, preferably from about 2 percent to about 4 percent by weight.

The wetting agents useful in the invention may vary widely and are those which are miscible with an oil phase and completely soluble in water, and possessing the necessary wetting and penetrating properties. Wetting agents which may conveniently be used can be chosen from the polyglycerates, ethoxylated mono- and diglycerides, and the polysorbates such as Polysorbate 60, Polysorbate 65, Polysorbate 80 and sorbitan monostearate. The polysorbates are preferred. The wetting agent is present in the range of from about 1.5 percent to about 10 percent by weight, preferably from about 2 percent to about 4 percent by weight.

In a preferred embodiment of the present invention, the blanching composition further comprises a sugar, which is included for osmotic balance. Nut kernels, and particularly those nut kernels having a high oil content such as walnuts, will absorb a significant amount of water before the pellicle is satisfactorily wetted. While it is desirable for the pellicle to absorb moisture, it is undesirable for the nut kernel to do so. Nut kernels containing increased amounts of water become fragile. When exposed to mechanical treatment such as high-pressure water to remove the pellicle, the nut kernels will tend to break up and otherwise be more susceptible to damage. Additionally, higher water content requires longer drying times, increasing the total time and energy output necessary for the overall process. By using a solution containing sugar, the osmotic differential is reduced so that water absorption into the nut kernel itself is reduced. Thus, addition of sugar to the composition of the present invention allows wetting of the pellicle to a greater extent than wetting of the nut kernel, which reduces damage to the kernel and reduces drying time. Any sugar can be used in the practice of the invention. The sugar may be selected from, but is not limited to, fructose, glucose, dextrose, inverted sugar syrups such as corn syrup, and mixtures thereof. The sugar is present in the range of from about 25 percent to about 60 percent by weight. The sugar is preferably about 30 percent. Amounts above 30 percent are as effective; however, such amounts are not necessary and are not cost-effective and are therefore less preferred. Salt may also be used to reduce the osmotic differential; however, such use will result in a salty-flavored nut product.

Various other materials may be included in the blanching solution in minor proportions to give the solution certain characteristics as may be desired. For example, mycostatic or bacteriostatic agents, such as acids or acid salts or sodium benzoate, may be added to give greater protective value against spoilage organisms. However, preservatives such as antioxidants, used to offset the development of rancidity and increase storage life, are not required with the present invention.

In the process of the present invention, the shelled nut kernels to be deskinned are immersed in a mixture which includes a vegetable oil and a wetting agent in a solution of water and, optionally, a sugar, at ambient temperature. The vegetable oil and wetting agent should be pre-mixed, forming a mild, edible vegetable oil soap, which is then mixed into the water and sugar. The kernels are left undisturbed in the mixture for a period of time sufficient to soften and loosen the pellicle. This period is usually from about 18 to about 24 hours, but may be optionally reduced via either vacuum or pressure treatment or alternating vacuum and pressure treatments, which act to drive the solution into the nuts. After soaking in the solution for the required time, the nut kernels are drained of solution and then exposed to a force of ambient temperature water sufficient to remove the softened and loosened pellicle from the nut kernels, preferably while the kernels are in motion, while imparting little or no physical damage to the kernels. This may be accomplished by, for example, agitated water or a spray or jet of water under pressure. The nut kernels are separated from the removed pellicle and rinsed, after which the kernels are dried by conventional means or further processed, as desired.

Generally, about equal quantities by weight of nut kernels and the blanching composition of the present invention are mixed together.

The process soaking time in the blanching solution may be reduced by subjecting the treating tank and its contents to a pressure of up to 20 psi above atmospheric pressure in order to assist the absorption of the blanching solution into the pellicle. Alternatively, sub-atmospheric pressure of up to about 25 inches of mercury, for example, may be drawn around the treating tank and its contents, release of which will cause absorption of the solution into the pellicle. Or, combinations of alternating pressure and sub-atmospheric pressure may be employed.

The nut kernels may be drained after soaking in the solution by passing the kernels over a perforated belt or shaker screen, for example. The drained blanching solution may be recovered and recycled back to succeeding treatment tanks for reuse, thus fully utilizing the contents and reducing the biological oxygen demand of any waste treatment system. Once the solution has discolored, it is no longer reused as it will tend to color the treated nut meats. Fully depleted or discolored process solution is suitable as a valuable food source for animals.

The rinse water and removed pellicle, after separation from the nut kernels, are separated from each other by means such as fine mesh dewatering screens, parabolic screen separators and/or centrifugation. The water may be recycled to the spray chamber. The separated pellicle is dried and forms a valuable source of walnut fiber. Whereas other processes render the pellicle useless, the present process results in pellicle which is useable as a fiber source.

The present invention results in walnuts free of all or substantially all pellicle. By substantially free is meant at least 75% of the pellicle is removed from the nut kernels. Additionally, the invention results in walnut meats whose characteristics are greatly changed from those with pellicle, resulting in a new and different product. The kernels are light in color, mild flavored and without off flavors, crisp in texture, and stable in storage. The kernels are suitable for further processing to add coatings or other flavors.

It has been found that the present invention has the ability to blanch dark colored, less valuable nut kernels, making them lighter in color for blending with other nut kernels of greater value.

The process and compositions of the present invention are further illustrated by the following examples. These examples are offered strictly for purposes of illustration, and are not intended to either limit or to define the invention.

EXAMPLE 1

The following is an exemplary formulation of a composition of the present invention. All amounts are in percent by weight.

Formulation A

| Formulation A | |
|---|---|
| Water | 63.9 |
| Sugar | 30.0 |
| Walnut Oil | 3.0 |
| Polysorbate 60 | 3.0 |
| Sorbic Acid | 0.05 |

| -continued | |
|---|---|
| Formulation A | |
| Sodium Benzoate | 0.05 |

The vegetable oil and the wetting agent are mixed together to form a mild, edible vegetable oil soap. This is then added to a mixture of the other ingredients and blended together in conventional manner.

Polysorbate 60 is available as DURKEX ® 60 from Durkee Products (SCM Corporation), as TWEEN ® 60 from ICI United States, and from other commercial suppliers.

EXAMPLE 2

The following is an example of the procedure for removing pellicle from walnuts according to the invention.

Five hundred pounds of shelled walnuts were submerged in approximately 500 pounds of Formulation A (Example 1) at ambient temperature and were left undisturbed in the solution for 24 hours. The nuts were dewatered by passing them over a shaker screen. The drained liquid was retained for later reuse. The drained nut kernels were placed in a rinse-spray chamber where ambient temperature water was forcibly sprayed so as to impinge upon the kernels while they are in motion. The pellicle, softened and loosened by exposure to Formulation A, was removed by the water sprays. The nut kernels were discharged from the upper surface of the rinse screens in the chamber and were dried in a tunnel dehydrator. The removed pellicle and water were discharged from below the rinsing screens and separated from each other. The water was pumped back into the spray chamber, while the separated pellicle was dried.

EXAMPLE 3

Various laboratory test were conducted to compare efficacy and observable differences between the process of the present invention and previously known treatments. Shelled walnut kernels were used in all treatments. After the appropriate treatment, each treatment group was evaluated for the number of kernels or pieces totally devoid of pellicle. Results are shown in Tables I and II below. The nut meats were then stored for six weeks, after which they were evaluated for organoleptic qualities. The results are indicated in Table III below.

TABLE I

Efficacy of Pellicle Removal,
Light Color Nut Meats

| Treatment | Percent of Pieces or Kernels Totally Devoid of Pellicle |
|---|---|
| Control, no treatment | 14 |
| 2% Sodium Hydroxide | 48 |
| 2% Sodium Hydroxide plus Acid Rinse | 61 |
| Plain Water, 24 hour soak | 60 |
| Formulation A (Ex. 1), 24 hour soak | 91 |

TABLE II

Efficacy of Pellicle Removal,
Combination Color Nut Meats

| Treatment | Percent of Pieces or Kernels Totally Devoid of Pellicle |
|---|---|
| Control, no treatment | 11 |
| 2% Sodium Hydroxide | 40 |
| 2% Sodium Hydroxide plus Acid Rinse | 52 |
| Plain Water, 24 hour soak | 58 |
| Formulation A (Ex. 1), 24 hour soak | 80 |

TABLE III

Organoleptic Evaluation
After 6 Weeks Storage

| Treatment | Observation |
|---|---|
| Control, no treatment | Standard material, flavor, color, and texture normal. |
| 2% Ammonium Hydroxide | Color of the kernels ranged from bright pink to lavender. There was a strong soapy flavor, and the flavor had the beginnings of rancidity. |
| 2% Ammonium Hydroxide plus Acid Rinse | Color of the kernels was a dull pink to dirty brown. There was a slight off-flavor and a rancid undernote. |
| Plain Water, 24 hour soak | The flavor remained fresh and mild. The kernels were bright and pale buff in color. Texture was slightly soft. |
| Formulation A (Ex. 1), 24 hour soak | The flavor remained fresh and mild. The texture was crisp. The kernels were bright and pale buff in color. |

What is claimed is:

1. A process for removing pellicle from nut kernels which comprises:
    (a) immersing said nut kernels in a composition comprising a mixture of a vegetable oil and a wetting agent in water at ambient temperature, to soften and loosen said pellicle;
    (b) removing said nut kernels from said composition and draining said nut kernels;
    (c) exposing said nut kernels to a force of ambient temperature water, to remove said pellicle; and
    (d) separating said nut kernels from said pellicle.

2. A process according to claim 1 wherein said vegetable oil is refined or partially refined, and said wetting agent is a member selected from the group consisting of polyglycerates and polysorbates.

3. A process for removing pellicle from nut kernels which comprises:
    (a) immersing said nut kernels in a composition comprising a mixture of a vegetable oil and a wetting agent in a solution of sugar and water at ambient temperature, to soften and loosen said pellicle;
    (b) removing said nut kernels from said composition and draining said nut kernels;
    (c) exposing said nut kernels to a force of ambient temperature water, to remove said pellicle; and
    (d) separating said nut kernels from said pellicle.

4. A process according to claim 3 wherein said vegetable oil is refined or partially refined.

5. A process according to claim 4 wherein said vegetable oil is a member selected from the group consisting of coconut oil, palm kernel oil, olive oil, soybean oil, corn oil, sesame oil, safflower oil, cottonseed oil, walnut oil and mixtures thereof.

6. A process according to claim 5 wherein said vegetable oil is a member selected from the group consisting of walnut oil and a mixture of walnut oil and one or more other refined or partially refined vegetable oils.

7. A process according to claim 3 wherein said wetting agent is a member selected from the group consisting of polyglycerates and polysorbates.

8. A process according to claim 7 wherein said wetting agent is a member selected from the group consisting of polysorbates.

9. A process according to claim 3 wherein said vegetable oil is present from about 1.5 to about 10 percent by weight, said wetting agent is present from about 1.5 to about 10 percent by weight, said sugar is present from about 25 to about 60 percent by weight, and said water is present from about 20 percent to about 72 percent by weight.

10. A process according to claim 9 wherein said vegetable oil is present from about 2 to about 4 percent by weight, said wetting agent is present from about 2 to about 4 percent by weight, said sugar is present at about 30 percent by weight, and said water is present from about 62 percent to about 66 percent by weight.

11. A process according to claim 3 wherein step
    (a) is conducted at a pressure above atmospheric pressure or at a pressure below atmospheric pressure or with combinations of alternating pressure and sub-atmospheric pressure.

12. A process for removing pellicle from walnut kernels which comprises:
    (a) immersing said walnut kernels in a composition comprising a mixture of a vegetable oil and a polysorbate in a solution of sugar and water at ambient temperature, to soften and loosen said pellicle;
    (b) removing said walnut kernels from said composition and draining said walnut kernels;
    (c) exposing said walnut kernels to a force of ambient temperature water, to remove said pellicle; and
    (d) separating said walnut kernels from said pellicle.

13. A process according to claim 12 wherein said vegetable oil is refined or partially refined and is a member selected from the group consisting of walnut oil and a mixture of walnut oil and one or more other vegetable oils.

14. A process according to claim 12 wherein said vegetable oil is present from about 1.5 to about 10 percent by weight, said wetting agent is present from about 1.5 to about 10 percent by weight, said sugar is present from about 25 to about 60 percent by weight, and said water is present from about 20 percent to about 72 percent by weight.

15. A process according to claim 14 wherein said vegetable oil is present from about 2 to about 4 percent by weight, said wetting agent is present from about 2 to about 4 percent by weight, said sugar is present at about 30 percent by weight, and said water is present from about 62 percent to about 66 percent by weight.

16. A process according to claim 12 wherein step (a) is conducted at a pressure above atmospheric pressure or at a pressure below atmospheric pressure or with combinations of alternating pressure and sub-atmospheric pressure.

* * * * *